US012482948B2

(12) United States Patent
Senoo et al.

(10) Patent No.: US 12,482,948 B2
(45) Date of Patent: Nov. 25, 2025

(54) ANTENNA ELEMENT AND ANTENNA DEVICE

(71) Applicant: JAPAN AVIATION ELECTRONICS INDUSTRY, LIMITED, Tokyo (JP)

(72) Inventors: Takuma Senoo, Tokyo (JP); Hiroshi Toyao, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 157 days.

(21) Appl. No.: 18/241,249

(22) Filed: Sep. 1, 2023

(65) Prior Publication Data

US 2024/0128649 A1 Apr. 18, 2024

(30) Foreign Application Priority Data

Oct. 12, 2022 (JP) ................................ 2022-164174
Oct. 12, 2022 (JP) ................................ 2022-164177

(51) Int. Cl.

*H01Q 13/02* (2006.01)
*H01Q 1/38* (2006.01)
*H01Q 9/04* (2006.01)

(52) U.S. Cl.

CPC ............... *H01Q 13/02* (2013.01); *H01Q 1/38* (2013.01); *H01Q 9/045* (2013.01)

(58) Field of Classification Search

CPC .......... H01Q 13/02; H01Q 1/38; H01Q 9/045; H01Q 1/36; H01Q 5/364; H01Q 9/0435; H01Q 9/0407

See application file for complete search history.

(56) References Cited

U.S. PATENT DOCUMENTS

| | | | | |
|---|---|---|---|---|
| 9,692,127 | B2 * | 6/2017 | Yamagajo | H01Q 5/40 |
| 11,158,948 | B2 * | 10/2021 | Lee | H01Q 5/335 |
| 2009/0128442 | A1 | 5/2009 | Fujita et al. | |
| 2013/0234909 | A1 * | 9/2013 | Koh | H01Q 9/42 343/860 |
| 2022/0200151 | A1 | 6/2022 | Wang et al. | |

FOREIGN PATENT DOCUMENTS

| | | | |
|---|---|---|---|
| CN | 108511913 | B | 9/2022 |
| EP | 2081256 | A1 | 7/2009 |
| JP | 2002009536 | A | 1/2002 |
| JP | 2004221965 | A | 8/2004 |
| JP | 2008079009 | A | 4/2008 |
| JP | 2009021884 | A | 1/2009 |

OTHER PUBLICATIONS

Extended European Search Report (EESR) dated Feb. 12, 2024, issued in counterpart European Application No. 23194364.8.

* cited by examiner

*Primary Examiner* — Seung H Lee
(74) *Attorney, Agent, or Firm* — Holtz, Holtz & Volek PC

(57) ABSTRACT

An antenna element is provided with an upper conductor, lower conductors, leg portions and feeding portions. The upper conductor is formed with aperture portions. The upper conductor has a middle portion, a ring portion and coupling portions. The ring portion is located apart from the middle portion and continuously surrounds the middle portion. The aperture portions are located between the middle portion and the ring portion in plan view. Each of the coupling portions couples the middle portion onto the ring portion. The leg portions extend from the ring portion. The lower conductors are apart from the upper conductor in an up-down direction and connected to the leg portions. the feeding portions extend from the upper conductor.

8 Claims, 8 Drawing Sheets

ANTENNA ELEMENT AND ANTENNA DEVICE

CROSS REFERENCE TO RELATED APPLICATIONS

This application is based on and claims priority under 35 U.S.C. § 119 to Japanese Patent Applications No. JP2022-164177 filed Oct. 12, 2022 and No. JP2022-164174 filed Oct. 12, 2022, the contents of which are incorporated herein in their entirety by reference.

BACKGROUND OF THE INVENTION

This invention relates to an antenna element and an antenna device provided with the antenna element.

As a typical patch antenna, for example, a patch antenna provided with a ceramic substrate disclosed in JP 2004-221965 A (Patent Document 1) is known.

Referring to FIG. 11, a patch antenna 90 disclosed in Patent Document 1 is provided with an antenna base substrate 92, a patch element 94 formed on a surface of the antenna base substrate 92 and two feeding conductors 96.

SUMMARY OF THE INVENTION

It is an object of the present invention to provide an antenna device which is downsized and reduced in weight in comparison with a typical patch antenna provided with a ceramic substrate and to provide an antenna element used in the antenna device.

One aspect of the present invention provides an antenna element for forming an antenna device by being mounted on a ground conductor via a dielectric body. The antenna element comprises an upper conductor, at least one lower conductor, at least one leg portion and at least one feeding portion. The upper conductor is formed with a plurality of aperture portions. The upper conductor has a middle portion, a ring portion and a plurality of coupling portions. The ring portion is located apart from the middle portion and continuously surrounds the middle portion. The aperture portions are located between the middle portion and the ring portion in plan view. Each of the coupling portions couples the middle portion and the ring portion to each other. The at least one leg portion extends from the ring portion. The at least one lower conductor is apart from the upper conductor in an up-down direction and connected to the at least one leg portion. The at least one feeding portion extends from the upper conductor.

Another aspect of the present invention provides an antenna device which comprises the aforementioned antenna element, a ground conductor and a dielectric body lying between the antenna element and the ground conductor.

In the antenna element of the above-mentioned aspect, the lower conductor forms a capacitor with the upper conductor. With this structure, the antenna element can be downsized. The upper conductor is formed with the plurality of aperture portions, so that the antenna element is reduced in weight. The antenna device provided with such an antenna element also can be downsized and reduced in weight.

An appreciation of the objectives of the present invention and a more complete understanding of its structure may be had by studying the following description of the preferred embodiment and by referring to the accompanying drawings.

Figure 1:
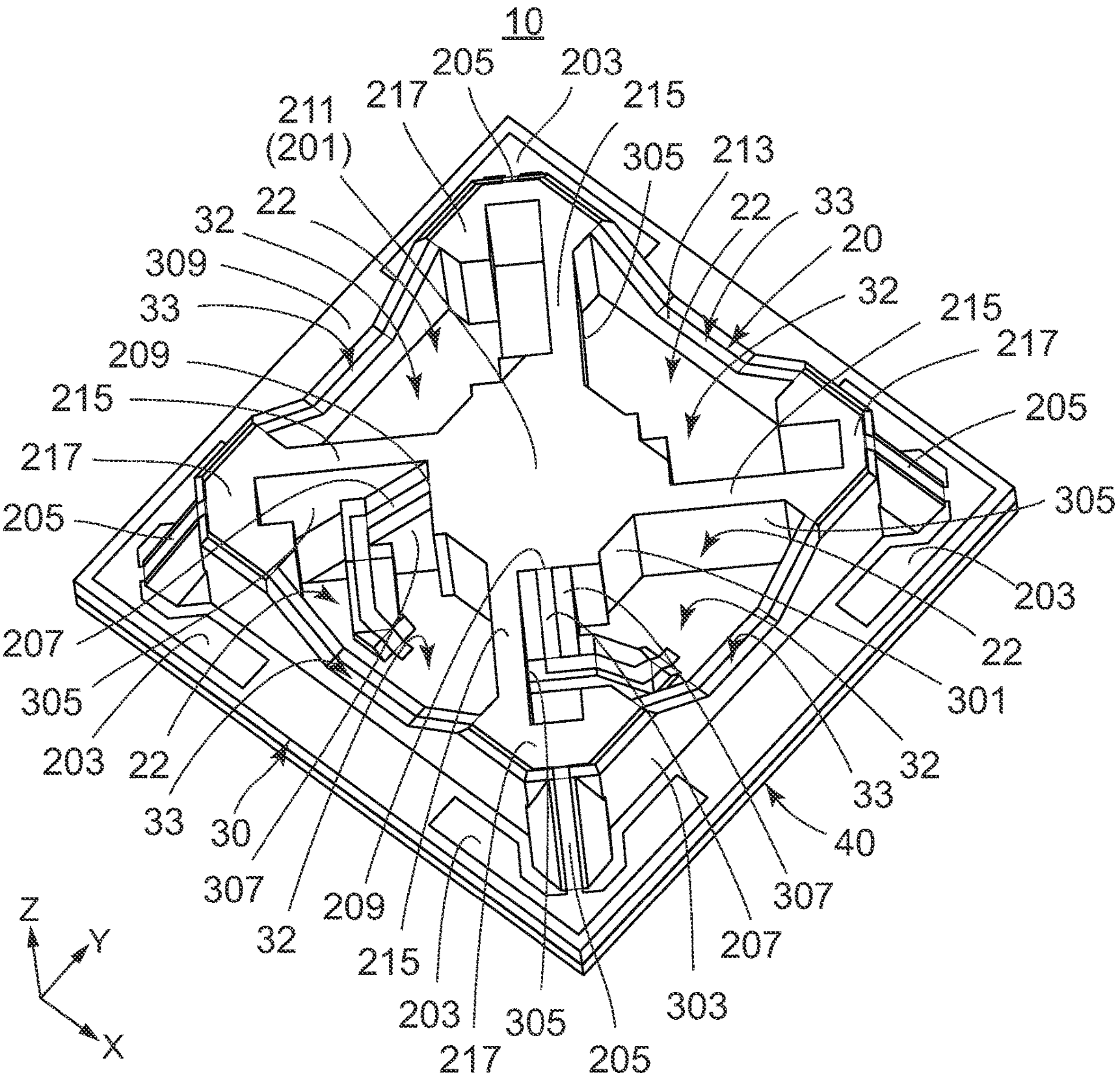
FIG. 1 is a perspective view showing an antenna device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
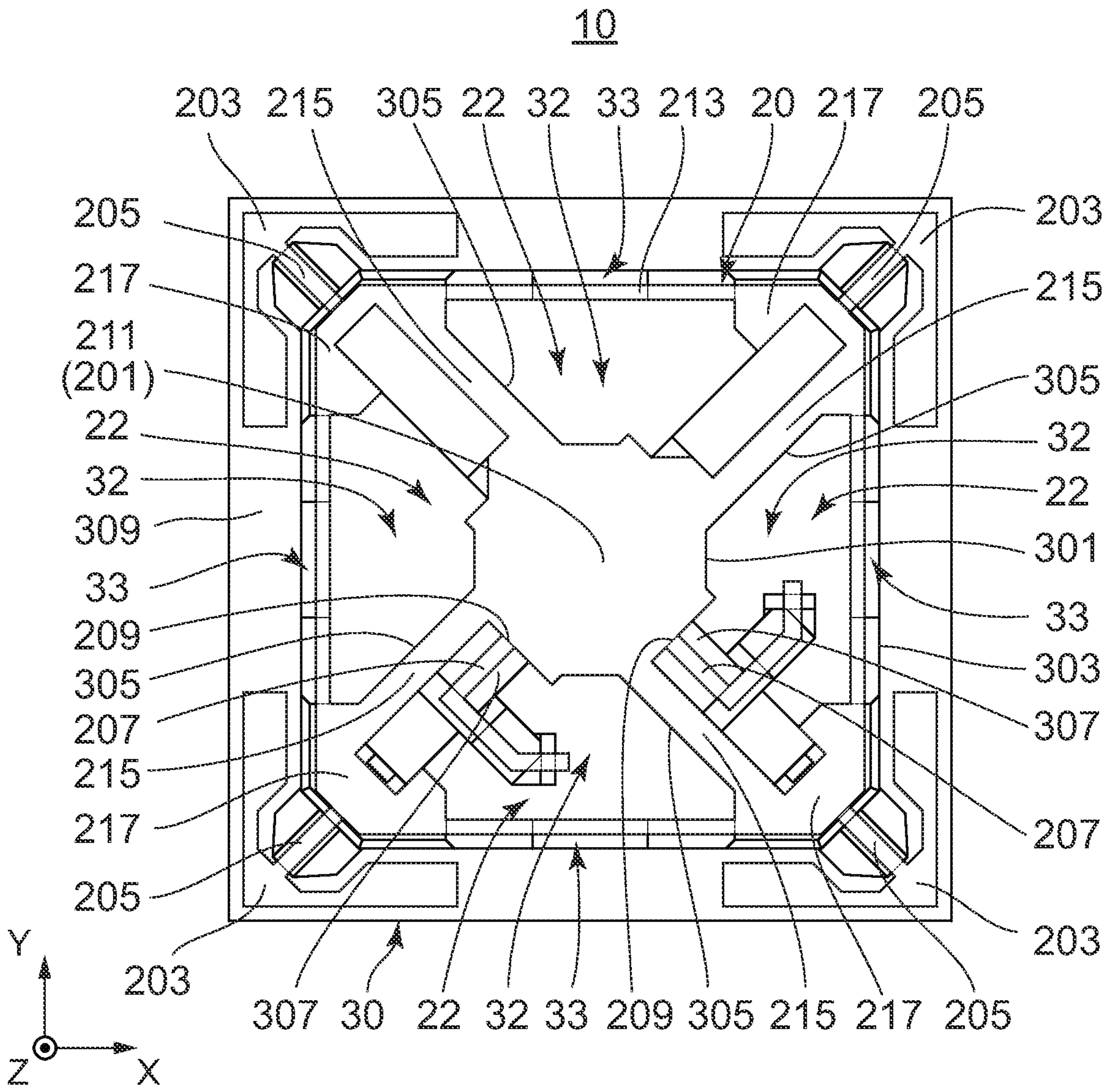
FIG. 2 is a top view showing the antenna device of FIG. 1.

Referring to FIGS. 1 and 2, an antenna device 10 according to an embodiment of the present invention is provided with an antenna element 20, a supporting portion or dielectric body 30 and a ground conductor 40. In other words, the antenna element 20 is provided on the ground conductor 40 via the supporting portion or dielectric body 30 and thereby forms the antenna device 10.

As shown in FIGS. 1 and 2, the antenna element 20 is provided with an upper conductor 201, at least one lower conductor 203, at least one leg portion 205 and at least one feeding portion 207.

As understood from FIGS. 1 and 2, in the present embodiment, the antenna element 20 is provided on the supporting portion 30. In other words, the upper conductor 201, the at least one lower conductor 203, the at least one leg portion 205 and the at least one feeding portion 207 are provided on the supporting portion 30. In the present embodiment, an up-down direction is a Z-direction. A positive Z-direction is directed upward while a negative Z-direction is directed downward.

The antenna element 20 shown in FIGS. 1 and 2 may be formed by a laser direct structuring (LDS) construction method, for example. In detail, the supporting portion 30 is produced by using a resin material in which a metal complex is dispersed. Applying a laser beam on a predetermined area of a surface of the supporting portion 30 reduces the metal complex. Reduced metal is used as catalytic nuclei, and selective plating is carried out on the predetermined area of the surface of the supporting portion 30. Thus, a plating film is made and becomes the antenna element 20. In the construction method, the laser beam is applied from above the supporting portion 30, and therefore the whole of the plating film is visible from above. Accordingly, in the present embodiment, the upper conductor 201, the at least one lower conductor 203, the at least one leg portion 205 and the at least one feeding portion 207 do not overlap with one another in plan view. However, the present invention is not limited thereto. The antenna element 20 may be formed by use of one or more sheet metals. In that case, if the antenna element 20 has a freestanding structure, a flat dielectric board may be used in place of the supporting portion 30. In this case, the antenna element 20 is mounted on the dielectric board.

Figure 3:
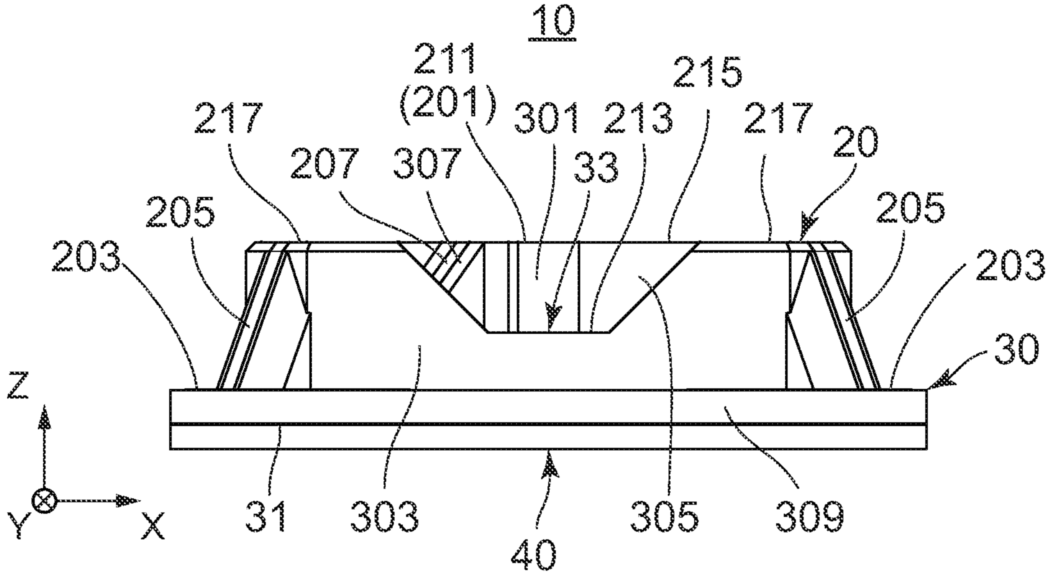
FIG. 3 is a side view showing the antenna device of FIG. 1.

As shown in FIG. 3, the ground conductor 40 is located just under the supporting portion 30. In other words, the antenna device 10 is mounted on the ground conductor 40. As the ground conductor 40, a circuit board in which a conductor layer is formed on an entire surface of each of upper and lower surfaces of a dielectric substrate may be used. In that case, it is preferable that the conductor layer on the upper surface and the conductor layer on the lower surface are connected to each other by use of vias and the like.

As shown in FIG. 3, in the present embodiment, on a lower surface of the supporting portion 30, a ground layer 31 is formed and covers almost the whole of the lower surface of the supporting portion 30. The ground conductor 40 arranged under the supporting portion 30 is electrically connected to the ground layer 31 formed on the lower surface of the supporting portion 30. However, the present invention is not limited thereto. The ground layer 31 may not be formed on the lower surface of the supporting portion 30.

As shown in FIG. 2, in the present embodiment, an outer shape of the upper conductor 201 is generally square in plan view. However, the present invention is not limited thereto. The outer shape of the upper conductor 201 may not be generally square in plan view. Nevertheless, in order to use the antenna device 10 for communication using circular polarized waves, it is preferable that the outer shape of the upper conductor 201 has approximately n-fold symmetry in plan view. Here, n is a multiple of four (the same applies hereafter).

As shown in FIG. 2, the upper conductor 201 has a middle portion 211, a ring portion 213 and a plurality of coupling portions 215. The middle portion 211 is part of the upper conductor 201 which includes a middle of the upper conductor 201 in plan view. The ring portion 213 is part of the upper conductor 201 which is along an outer edge of the upper conductor 201. The coupling portions 215 are parts of the upper conductor 201 each of which couples the middle portion 211 and the ring portion 213 to each other. Each of the coupling portions 215 has an end area 217 which is a relatively wide area connected to the ring portion 213. It is noted that a boundary between the middle portion 211 and each of the coupling portions 215 and a boundary between the ring portion 213 and each of the coupling portions 215 are indefinite.

As understood from FIGS. 1 and 2, the middle portion 211, the ring portion 213 and the coupling portions 215 define a plurality of aperture portions 22. In other words, the aperture portions 22 are formed in the upper conductor 201. Each of the aperture portions 22 is located between the middle portion 211 and the ring portion 213 in plan view. In the present embodiment, the coupling portions 215 are four in number, and the aperture portions 22 are four in number. Formation of the aperture portions 22 can reduce an amount of metal material and reduce a weight.

As shown in FIG. 2, in the present embodiment, each of the at least one lower conductor 203 and the at least one leg portion 205 is four in number. In the present embodiment, the at least one feeding portion 207 is two in number. In other words, in the present embodiment, the at least one lower conductor 203 provides four lower conductors 203. Moreover, the at least one leg portion 205 provides four leg portions 205. Furthermore, the at least one feeding portion 207 has two feeding portions 207. However, the present invention is not limited thereto. Each of the number of the lower conductors 203, the number of the leg portions 205 and the number of the feeding portions 207 may be freely set. Although the number of the lower conductors 203 and the number of the leg portions 205 are equal to each other in the present embodiment, they do not have to be equal to each other.

As shown in FIG. 2, in the present embodiment, the lower conductors 203 are arranged at corner portions of the supporting portion 30, respectively. In the present embodiment, a shape of each of the lower conductors 203 is an L-shape in plan view. However, the present invention is not limited thereto. The shape of each of the lower conductors 203 may be freely set. Nevertheless, it is preferable that the lower conductors 203 are formed in approximately n-fold symmetry about the middle of the supporting portion 30 plan view.

As understood from FIGS. 1 and 2, each of the lower conductors 203 is connected to the leg portion 205 corresponding thereto. In other words, the at least one lower conductor 203 and the at least one leg portion 205 are connected to each other in a one-to-one relationship.

As shown in FIG. 1, the supporting portion 30 has a middle supporting portion 301, a ring supporting portion 303, at least one coupling supporting portion 305, at least one feeding supporting portion 307 and a plate portion 309. In the present embodiment, the at least one coupling supporting portion 305 is four in number. In the present embodiment, the at least one feeding supporting portion 307 is two in number.

As understood from FIGS. 1 and 3, the middle supporting portion 301, the ring supporting portion 303, the coupling supporting portions 305 and the feeding supporting portions 307 protrude upward from an upper surface of the plate portion 309. The middle supporting portion 301, the ring supporting portion 303 and the coupling supporting portions 305 define a plurality of recess portions 32. In other words, the supporting portion 30 is formed with the recess portions 32 each of which is recessed downward in the up-down direction. The recess portions 32 positionally correspond to the aperture portions 22 of the upper conductor 201, respectively. Formation of the recess portions 32 can reduce loss of the antenna device 10 caused by resin. On the other hand, the ring supporting portion 303 has additional recess portions 33 each of which is recessed downward in the up-down direction.

As understood from FIGS. 1 and 2, the middle supporting portion 301 corresponds to the middle portion 211 and supports the middle portion 211. The ring supporting portion 303 corresponds to the ring portion 213 and supports the ring portion 213. The middle supporting portion 301 and the ring supporting portion 303 are located apart from each other and connected to each other by the coupling supporting portions 305. The coupling supporting portions 305 correspond to the coupling portions 215, respectively. Each of the coupling supporting portions 305 supports the coupling portion 215 corresponding thereto. The feeding supporting portions 307 correspond to the feeding portions 207, respectively. Each of the feeding supporting portions 307 supports the feeding portion 207 corresponding thereto.

As shown in FIGS. 1 and 2, in the present embodiment, the middle portion 211 is provided on an upper surface of the middle supporting portion 301. An outer shape of the middle portion 211 is generally octagonal in plan view.

As shown in FIGS. 1 and 2, in the present embodiment, the ring portion 213 extends along an upper surface of the ring supporting portion 303 including the additional recess portions 33. A shape of the ring portion 213 is a frame shape which is generally square along the outer shape of the upper conductor 201 in plan view. The ring portion 213 is located apart from and outward of the middle portion 211 and continuously surrounds the middle portion 211 in plan view. Each of the additional recess portions 33 is located at a middle portion of any of edges of the ring portion 213.

As shown in FIGS. 1 and 2, in the present embodiment, the number of the coupling portions 215 is four. Each of the coupling portions 215 is provided on an upper surface of the coupling supporting portion 305 corresponding thereto. Each of the coupling portions 215 corresponds to any one of eight corners of the middle portion 211, and the coupling portions 215 correspond to four corners of the ring portion 213, respectively. Each of the coupling portions 215 couples the corner of the middle portion 211 corresponding thereto to the corner of the ring portion 213 corresponding thereto.

As understood from FIGS. 1 and 3, in the present embodiment, the middle portion 211 and the coupling portions 215 are located on a specific plane perpendicular to the up-down direction. The ring portion 213 is located on the specific plane in part. The ring portion 213 has parts located downward of the specific plane in the up-down direction or corresponding to the additional recess portions 33, respectively.

As shown in FIGS. 1 and 2, the lower conductors 203 are provided on the upper surface of the plate portion 309 and apart from the upper conductor 201 in the up-down direction. In detail, the lower conductors 203 are located downward of the upper conductor 201 in the up-down direction.

As shown in FIGS. 1 and 2, the leg portions 205 extend from the ring portion 213. In the present embodiment, the leg portions 205 extend outward from an outer edge of the ring portion 213 in plan view. In detail, each of the leg portions 205 extends diagonally downward from any one of the four corners of the ring portion 213.

As shown in FIGS. 1 and 2, the feeding portions 207 extend from the upper conductor 201. In the present embodiment, each of the feeding portions 207 extends toward any one of the corners of the ring portion 213 from the middle portion 211 and then extends toward a middle portion of any one of the recess portions 32. However, the present invention is not limited thereto. The feeding portions 207 may extend from the coupling portions 215.

As understood from FIG. 2, two imaginary lines each of which connects the middle of the middle portion 211 to each of the feeding portions 207 intersect each other at 90 degrees in plan view. In detail, when a connection point between each of the feeding portions 207 and the middle portion 211 is a feeding point 209, two imaginary lines each of which connects a middle of the middle portion 211 and each of the two feeding points 209 intersect each other at 90 degrees. Accordingly, communication using circular polarized waves according to a two-point feeding system can be realized by use of the antenna device 10.

In the antenna device 10 shown in FIGS. 1 to 3, each of the lower conductors 203 forms a capacitor with the upper conductor 201 or any one of the coupling portions 215. Accordingly, existence of the lower conductors 203 give an effect on resonant frequencies of the antenna device 10. In detail, the existence of the lower conductors 203 reduces the resonant frequencies in comparison with a case of their absence. In other words, the existence of the lower conductors 203 allows the antenna element 20 having predetermined resonance frequencies to be downsized and thereby allows the antenna device 10 to be downsized.

In the antenna device 10 shown in FIGS. 1 to 3, the shape of each of the lower conductors 203 and a size of each of the lower conductors 203 affect setting of the resonance frequencies. In addition, the shape of the ring portion 213 and a size of the ring portion 213 affect setting of the resonance frequencies. Since the ring portion 213 is partly located downward of the specific plane in the up-down direction, the resonance frequencies can be lowered in comparison with a case where the ring portion 213 is wholly located on the specific plane. Thus, the antenna element 20 can be downsized, and thereby the antenna device 10 can be downsized.

The antenna device 10 shown in FIGS. 1 to 3 employs the two-point feeding system. In detail, by inputting a first input signal into one of the feeding portions 207 and inputting a second input signal which has a phase different from that of the first input signal at 90 degrees to the other of the feeding portions 207, the antenna element 20 can perform communication using circular polarized waves having a high degree of roundness. In order to realize the communication with the circular polarized waves having the high degree of roundness, the shape of the upper conductor 201 and an arrangement of the lower conductors 203 are preferable to be approximately n-fold symmetry.

Although the specific explanation about the present invention is made above with reference to concrete embodiments, the present invention is not limited thereto but susceptible of various modifications and alternative forms without departing from the spirit of the invention.

[First Modification]

Figure 4:
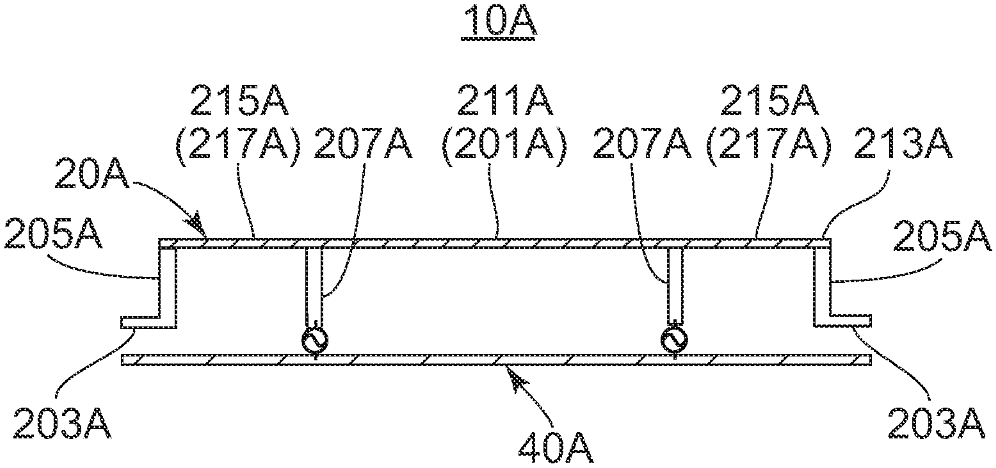
FIG. 4 is a schematic view showing a first modification of an antenna device according to the present invention.

Referring to FIG. 4, an antenna element 20A is provided with an upper conductor 201A, at least one lower conductor 203A, at least one leg portion 205A and at least one feeding portion 207A. The antenna element 20A does not have the supporting portion 30 (see FIGS. 1 to 3).

As shown in FIG. 4, the antenna element 20A is arranged upward of and apart from a ground conductor 40A and forms an antenna device 10A. The antenna element 20A and the ground conductor 40A are fixed to each other with supporting members (not shown). Between the antenna element 20A and the ground conductor 40A, air exists as a dielectric body. Thus, in the antenna device of the present invention, the dielectric body may be air. Also in the present modification, a ring portion 213A may have parts located downward of the specific plane in the up-down direction in a manner similar to the ring portion 213 shown in FIGS. 1 to 3.

[Second Modification]

Figure 5:
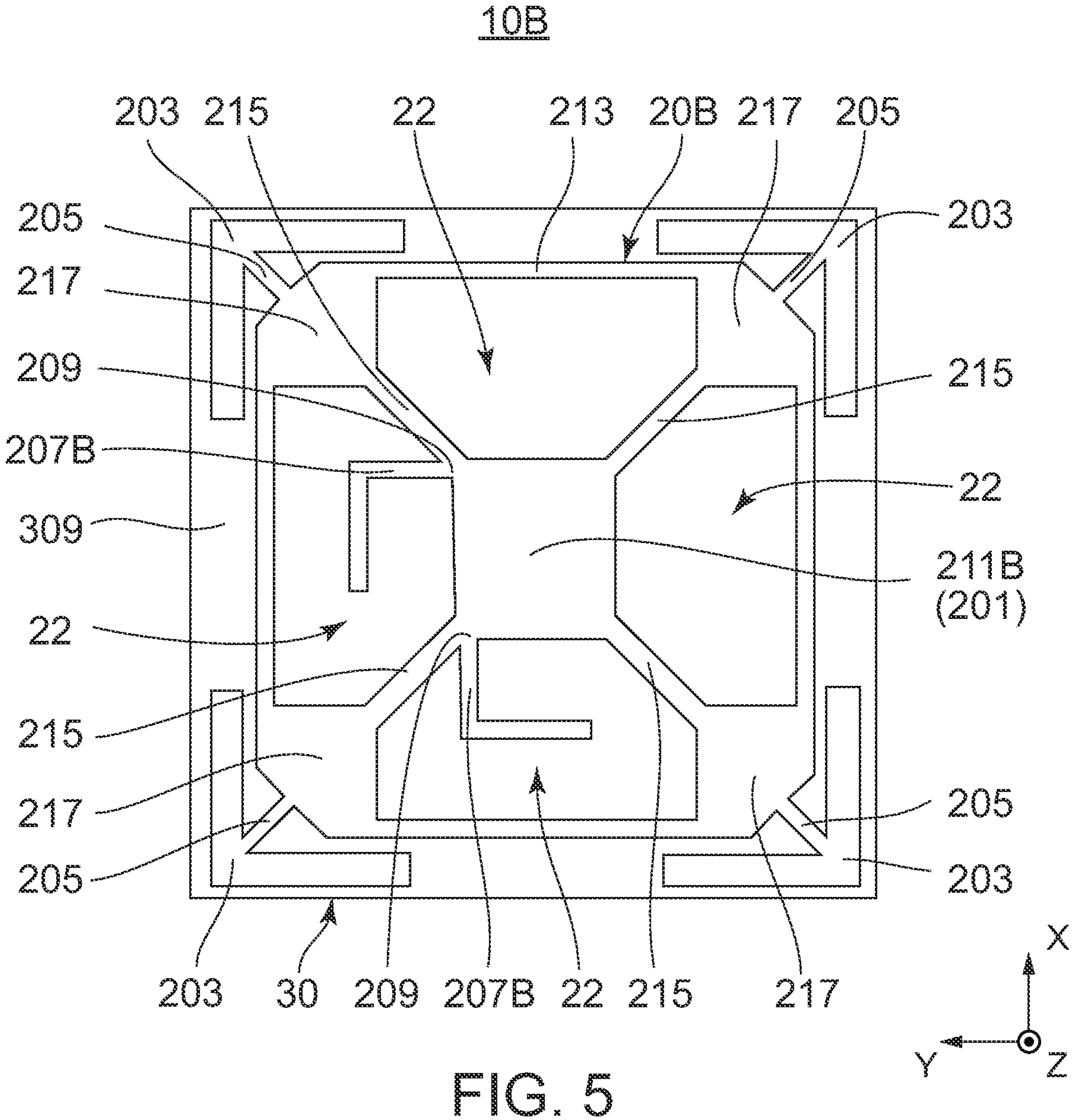
FIG. 5 is a top view showing a second modification of the antenna device according to the present invention. Regarding a supporting portion, only a plate portion is shown.

Referring to FIG. 5, in an antenna element 20B, a shape of a middle portion 211B of an upper conductor 201 is generally square in plan view. Thus, the shape of the middle portion 211B of the upper conductor 201 may be freely set. Nevertheless, in order to perform communication using circular polarized waves, it is preferable that the shape of the middle portion 211B has n-fold symmetry.

In the antenna element 20B, each of feeding portions 207B is connected to any one of four corners of the middle portion 211B. Also in the present modification, two imaginary lines each of which connects a middle of the middle portion 211B to each of the two feeding portions 207B intersect each other at 90 degrees in plan view. In detail, when a connection point between each of the feeding portions 207B and the middle portion 211B is a feeding point 209, two imaginary lines each of which connects a middle of the middle portion 211B and each of the two feeding points 209 intersect each other at 90 degrees.

[Third Modification]

Figure 6:
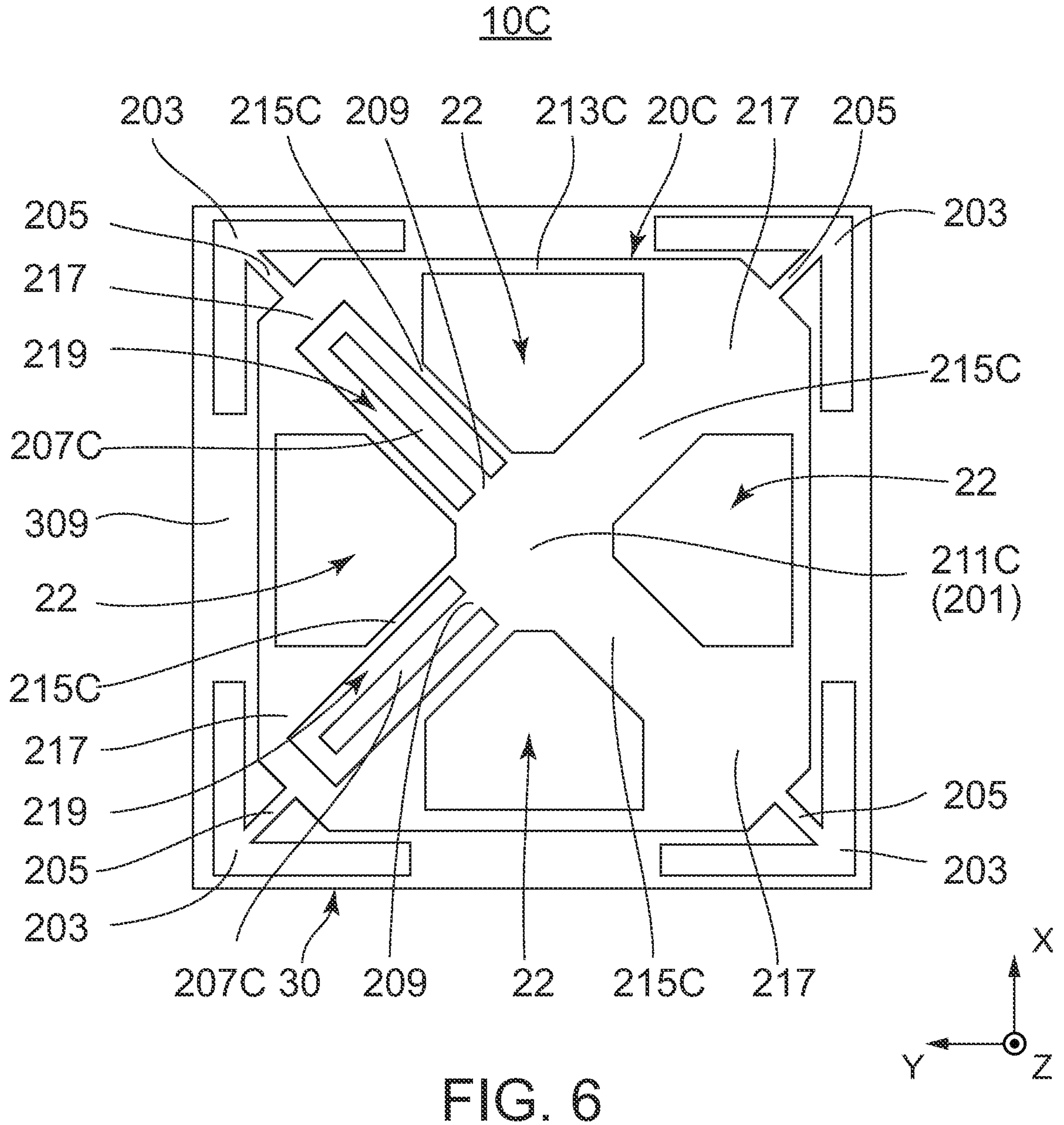
FIG. 6 is a top view showing a third modification of the antenna device according to the present invention. Regarding a supporting portion, only a plate portion is shown.

Referring to FIG. 6, in an antenna element 20C, each of coupling portions 215C corresponds to any one of eight edges of a middle portion 211C. Each of the coupling portions 215C couples the edge of the middle portion 211C corresponding thereto to the corner of a ring portion 213C corresponding thereto. Each of feeding portions 207C is arranged in a slot 219 formed in any one of the coupling portions 215C. Each of the feeding portions 207C extends toward any one of the corners of the ring portion 213C from any one of the edges of the middle portion 211C.

[Fourth Modification]

Figure 7:
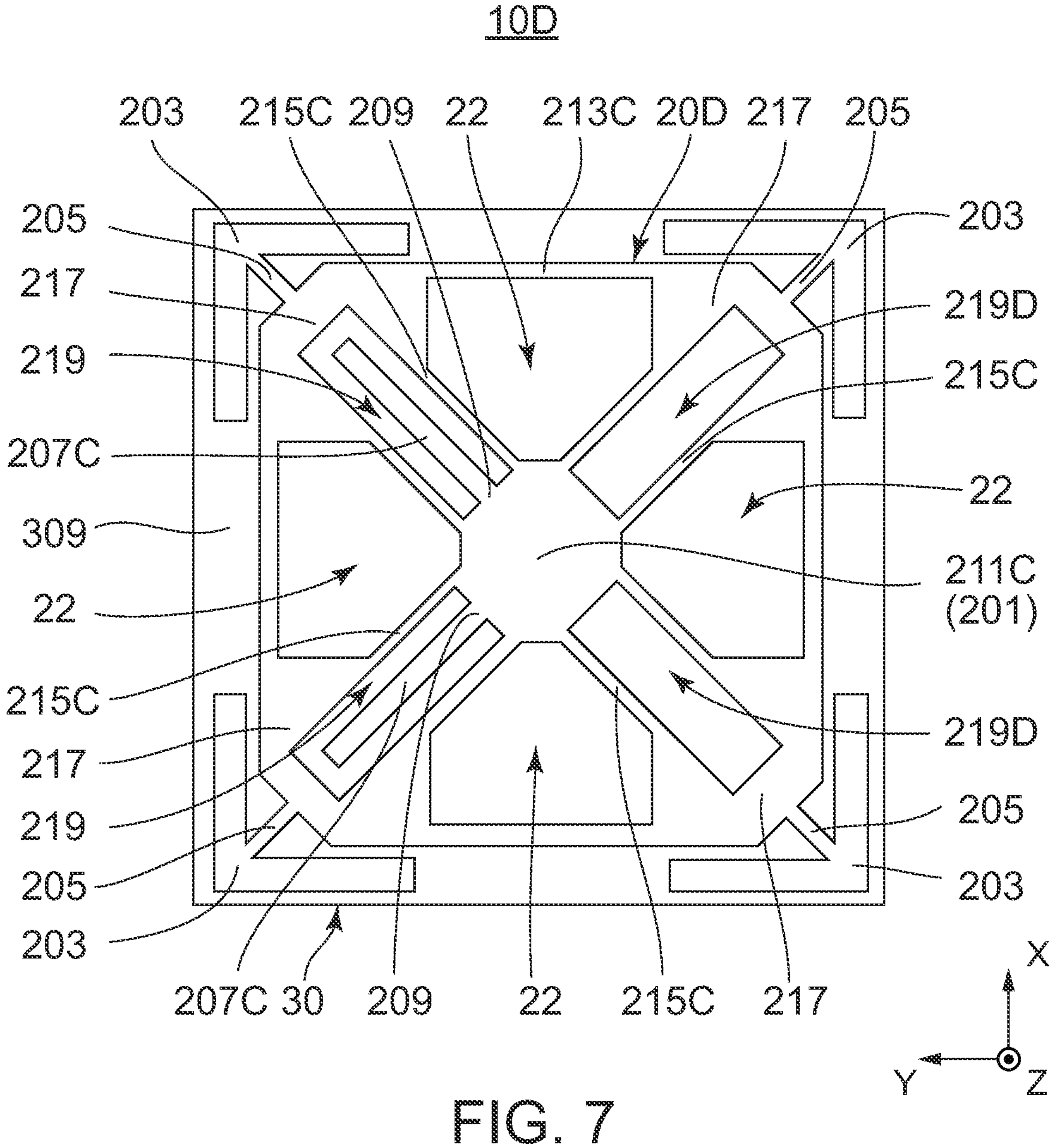
FIG. 7 is a top view showing a fourth modification of the antenna device according to the present invention. Regarding a supporting portion, only a plate portion is shown.

Referring to FIG. 7, an antenna element 20D differs from the antenna element 20C of the third modification in that it has dummy slots 219D. The antenna element 20D can be reduced in metal material and weight in comparison with the antenna element 20C of the third modification.

[Fifth Modification]

Figure 8:
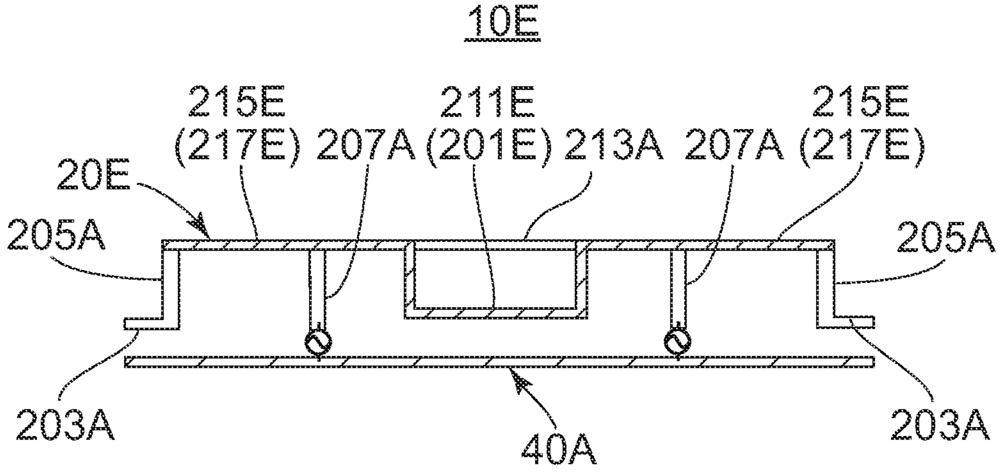
FIG. 8 is a schematic view showing a fifth modification of the antenna device according to the present invention.

Referring to FIG. 8, an antenna element 20E differs from the antenna element 20A of the first modification in that a middle portion 211E of an upper conductor 201E is located downward of end areas 217E of coupling portions 215E in the up-down direction. Thus, in the antenna element of the present invention, a middle portion of an upper conductor and coupling portions may not be partly located on the same plane. The antenna element 20E may have the shape shown in FIG. 5, 6 or 7 in plan view. A ring portion 213A of the upper conductor 201E may have part which is located downward of the specific plane in the up-down direction.

[Sixth Modification]

Figure 9:
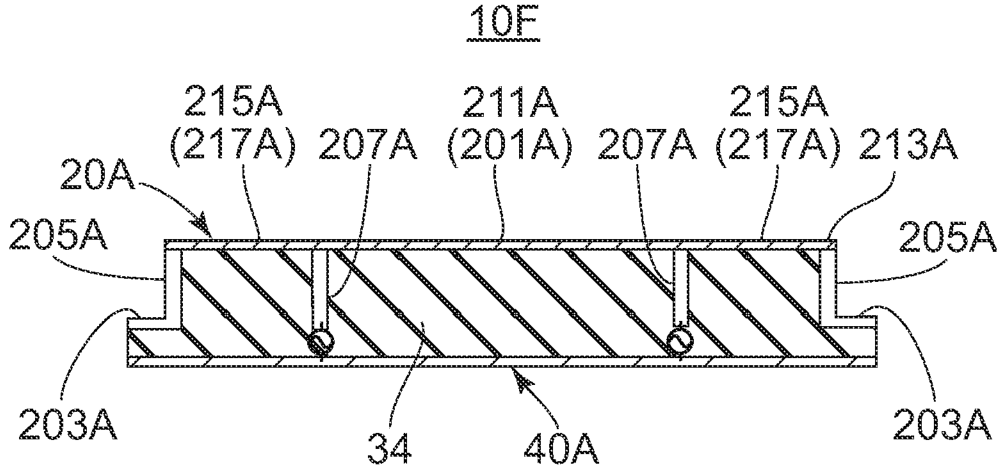
FIG. 9 is a schematic view showing a sixth modification of the antenna device according to the present invention.
Figure 10:
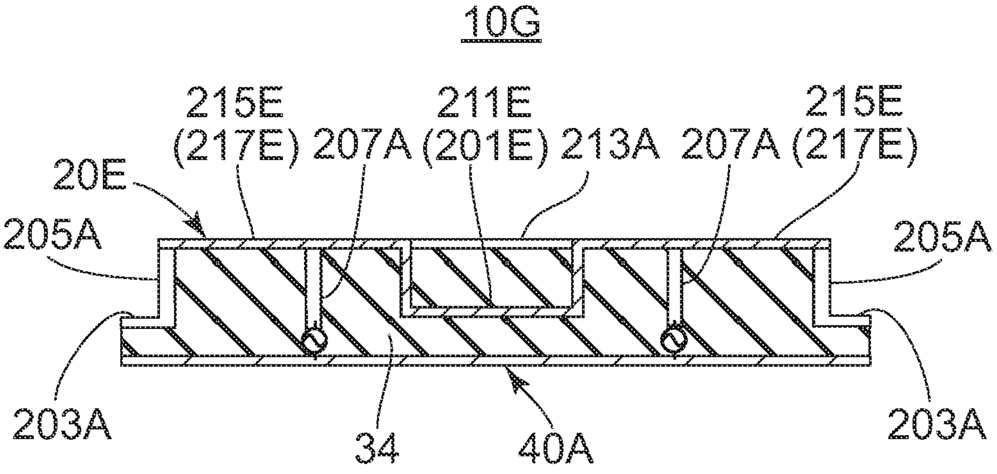
FIG. 10 is a schematic view showing a seventh modification of the antenna device according to the present invention.
Figure 11:
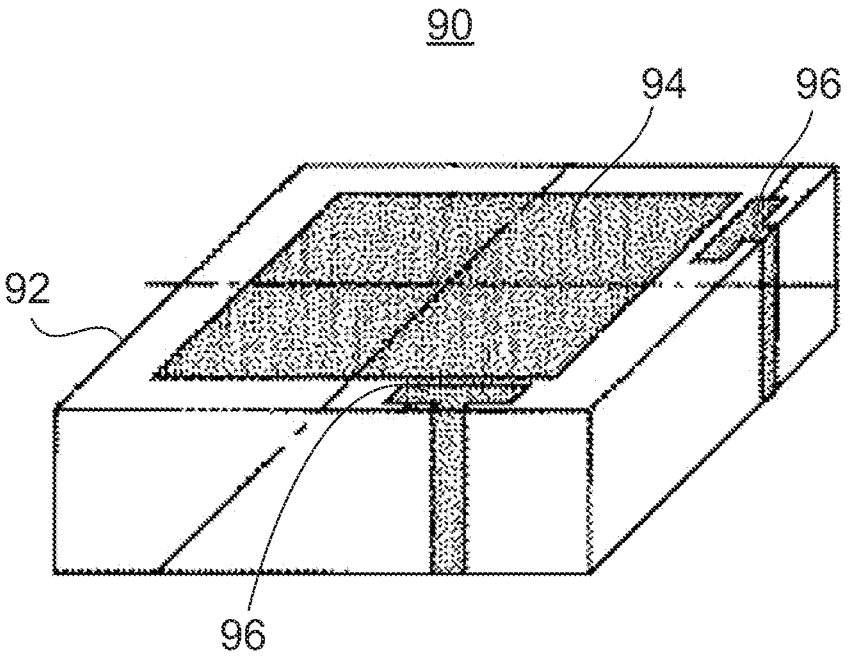
FIG. 11 PRIOR ART
FIG. 11 is a perspective view showing a patch antenna disclosed in Patent Document 1.

Referring to FIG. 9, an antenna device 10F differs from the antenna device 10A of FIG. 4 in that a dielectric body 34 is filled in a space between an antenna element 20A and a ground conductor 40A. Referring to FIG. 10, an antenna device 10G differs from the antenna device 10E of FIG. 8 in that a dielectric body 34 is filled in a space between an antenna element 20E and a ground conductor 40A and in a space above a middle portion 211E. In each of the above cases, as the dielectric body 34, any resin, such as epoxy resin, Teflon (Registered Trademark), etc., may be used. Thus, in the antenna device of the present invention, any material may be used as the dielectric body.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An antenna element for forming an antenna device by being mounted on a ground conductor via a dielectric body, wherein:

the antenna element comprises an upper conductor, at least one lower conductor, at least one leg portion and at least one feeding portion;

the upper conductor is formed with a plurality of aperture portions;

the upper conductor has a middle portion, a ring portion and a plurality of coupling portions;

the ring portion is located apart from the middle portion and continuously surrounds the middle portion;

the aperture portions are located between the middle portion and the ring portion in plan view;

each of the coupling portions couples the middle portion and the ring portion to each other;

the at least one leg portion extends from the ring portion;

the at least one lower conductor is apart from the upper conductor in an up-down direction and connected to the at least one leg portion;

the at least one feeding portion extends from the upper conductor;

the at least one feeding portion comprises two feeding portions; and two imaginary lines each of which connects a middle of the middle portion and each of the two feeding portions to each other intersect each other at 90 degrees in plan view.

2. The antenna element as recited in claim 1, wherein:

the at least one lower conductor comprises four lower conductors;

the at least one leg portion comprises four leg portions; and the at least one lower conductor and the at least one leg portion are connected to each other in a one-to-one relationship.

3. The antenna element as recited in claim 1, wherein the upper conductor, the at least one lower conductor, the at least one leg portion and the at least one feeding portion are provided on a supporting portion made of resin.

4. The antenna element as recited in claim 3, wherein:

the supporting portion is formed with a plurality of recess portions each of which is recessed downward in the up-down direction; and the recess portions correspond to the aperture portions, respectively, in position.

5. The antenna element as recited in claim 3, wherein the upper conductor, the at least one lower conductor, the at least one leg portion and the at least one feeding portion do not overlap with each other in plan view.

6. The antenna element as recited in claim 5, wherein:

the supporting portion has a middle supporting portion which supports the middle portion, a ring supporting portion which supports the ring portion and a plurality of coupling supporting portions which support the coupling portions, respectively; and the middle supporting portion and the ring supporting portion are located apart from each other and connected to each other by the coupling supporting portions.

7. The antenna element as recited in claim 6, wherein:

the ring supporting portion has an additional recess portion which is recessed downward in the up-down direction; and the ring portion extends along an upper surface of the ring supporting portion which includes the additional recess portion.

8. An antenna device comprising an antenna element as recited in claim 1, a ground conductor and a dielectric body lying between the antenna element and the ground conductor.

* * * * *